(12) United States Patent
Sharma et al.

(10) Patent No.: US 9,377,964 B2
(45) Date of Patent: Jun. 28, 2016

(54) SYSTEMS AND METHODS FOR IMPROVING SNAPSHOT PERFORMANCE

(71) Applicant: Veritas Technologies LLC, Mountain View, CA (US)

(72) Inventors: Srikant Sharma, Sunnyvale, CA (US); Abhay Marode, Sunnyvale, CA (US); Mark A. Ditto, Eastsound, WA (US)

(73) Assignee: Veritas Technologies LLC, Mountain View, CA (US)

( * ) Notice: Subject to any disclaimer, the term of this patent is extended or adjusted under 35 U.S.C. 154(b) by 184 days.

(21) Appl. No.: 14/143,194

(22) Filed: Dec. 30, 2013

(65) Prior Publication Data

US 2015/0186044 A1 Jul. 2, 2015

(51) Int. Cl.
*G06F 12/00* (2006.01)
*G06F 3/06* (2006.01)

(52) U.S. Cl.
CPC .............. *G06F 3/065* (2013.01); *G06F 3/0604* (2013.01); *G06F 3/0683* (2013.01)

(58) Field of Classification Search
CPC ...... G06F 3/0604; G06F 3/065; G06F 3/0683
USPC .......................................................... 711/162
See application file for complete search history.

(56) References Cited

U.S. PATENT DOCUMENTS 7,370,164 B1 * 5/2008 Nagarkar ............ G06F 11/1451
707/999.202
8,346,727 B1 * 1/2013 Chester ............. G06F 17/30233
707/640
2010/0077165 A1 3/2010 Lu et al.
2012/0297246 A1 * 11/2012 Liu ........................ G06F 3/0482
714/15

FOREIGN PATENT DOCUMENTS

WO WO2013/086040 * 6/2013 .............. G06F 11/07
WO WO-2013/086040 A2 6/2013

OTHER PUBLICATIONS

International Search Report and Written Opinion issued by the U. S. Patent and Trademark Office as International Searching Authority for International Application No. PCT/US2014/069324 dated Mar. 3, 2015 (15 pages).

* cited by examiner

*Primary Examiner* — Yong Choe
(74) *Attorney, Agent, or Firm* — Wilmer Cutler Pickering Hale and Dorr LLP (57) ABSTRACT

Techniques for improving snapshot performance are disclosed. In one embodiment, the techniques may be realized as a method for improving snapshot performance comprising initiating change block tracking for each unit of storage associated with each of a plurality of virtual machines, creating backup images of each unit of storage associated with each of the plurality of virtual machines, quiescing each of the plurality of virtual machines, and creating snapshots of each unit of storage associated with each of the plurality of virtual machines. The techniques may include identifying one or more changed blocks in at least one of the backup images using the change block tracking, editing the at least one of the backup images by replacing the identified one or more changed blocks using corresponding blocks from at least one snapshot of the snapshots, and releasing the at least one snapshot based upon a determination that editing has completed.

20 Claims, 4 Drawing Sheets

SYSTEMS AND METHODS FOR IMPROVING SNAPSHOT PERFORMANCE

FIELD OF THE DISCLOSURE

The present disclosure relates generally to data backup and, more particularly, to techniques for improving snapshot performance.

BACKGROUND OF THE DISCLOSURE

The use of virtual machines requires an ability to scale backup processes to accommodate multiple virtual machines on a single platform. To ensure a consistent backup of a plurality of virtual machines on a platform may require a resource intensive process including: quiescing all virtual machines, snapshotting all virtual machines, snapshotting one or more storage devices, and creating backup images by reading consistent data of the snapshots. Snapshots may not be released until backup images are created. This may increase a duration of time that a snapshot is maintained. A hypervisor may maintain a delta of the changed data for a virtual disk while a snapshot of the virtual disk is maintained. When a snapshot is released a hypervisor may merge the delta of changed data back into the virtual disk. This merge process may be a resource intensive operation (e.g., have significant I/O (Input/Output) demands). If multiple virtual machines are present, multiple snapshots may be maintained until backup images are complete. This may increase the duration that each snapshot is maintained and may increase a size of a delta of changed virtual disk data maintained. Thus, when multiple snapshots are released for multiple virtual machines, a merge process for corresponding deltas of changed virtual disk data may have significant resource impact (e.g., I/O and CPU usage).

In view of the foregoing, it may be understood that there may be significant problems and shortcomings associated with current data backup technologies.

SUMMARY OF THE DISCLOSURE

Techniques for improving snapshot performance are disclosed. In one embodiment, the techniques may be realized as a method for improving snapshot performance comprising initiating change block tracking for each unit of storage associated with each of a plurality of virtual machines, creating backup images of each unit of storage associated with each of the plurality of virtual machines, quiescing each of the plurality of virtual machines, creating snapshots of each unit of storage associated with each of the plurality of virtual machines, and identifying, using at least one computer processor, one or more changed blocks in at least one of the backup images using the change block tracking. The method may also include editing the at least one of the backup images by replacing the identified one or more changed blocks using corresponding blocks from at least one snapshot of the snapshots, and releasing the at least one snapshot based upon a determination that editing of the at least one backup image has completed and produced a consistent backup image, wherein release of the at least one snapshot is independent of release of any other of the snapshots.

In accordance with other aspects of this particular exemplary embodiment, quiescing of each of the plurality of virtual machines may be instantiated independently.

In accordance with further aspects of this particular exemplary embodiment, the method may further comprise taking a storage snapshot for at least one of the units of storage after initiating change block tracking for the at least one of the units of storage.

In accordance with additional aspects of this particular exemplary embodiment, the storage snapshot may provide a single snapshot allowing restoration of all of the plurality of virtual machines.

In accordance with additional aspects of this particular exemplary embodiment, the consistent backup image may be a crash consistent backup image.

In accordance with additional aspects of this particular exemplary embodiment, the consistent backup image may be an application consistent backup image.

In accordance with additional aspects of this particular exemplary embodiment, the snapshot creation may be configured to be instantiated as each virtual machine of the plurality of virtual machines is quiesced, and is independent of a state of other virtual machines of the plurality of virtual machines.

In accordance with additional aspects of this particular exemplary embodiment, editing of the at least one backup image may be configured to be performed independently of editing of any of the other of the backup images.

In accordance with additional aspects of this particular exemplary embodiment, the unit of storage may comprise a virtual hard drive.

In accordance with additional aspects of this particular exemplary embodiment, at least one unit of storage associated with each of the plurality of virtual machines may comprise physical storage.

In accordance with additional aspects of this particular exemplary embodiment, the techniques may be realized as at least one non-transitory processor readable storage medium storing a computer program of instructions configured to be readable by at least one processor for instructing the at least one processor to execute a computer process for performing the method.

In another embodiment, the techniques may be realized as an article of manufacture for improving snapshot performance. The article of manufacture may comprise at least one non-transitory processor readable storage medium, and instructions stored on the at least one medium. The instructions may be configured to be readable from the at least one medium by at least one processor and thereby cause the at least one processor to operate so as to: initiate change block tracking for each unit of storage associated with each of a plurality of virtual machines, create backup images of each unit of storage associated with each of the plurality of virtual machines, quiesce each of the plurality of virtual machines, create snapshots of each unit of storage associated with each of the plurality of virtual machines, and identify one or more changed blocks in at least one of the backup images using the change block tracking. The instructions may be configured to cause the processor to operate so as to edit the at least one of the backup images by replacing the identified one or more changed blocks using corresponding blocks from at least one snapshot of the snapshots and release the at least one snapshot based upon a determination that editing of the at least one backup image has completed and produced a consistent backup image, wherein release of the at least one snapshot is independent of release of any other of the snapshots.

In accordance with additional aspects of this particular exemplary embodiment, the snapshot creation may be configured to be instantiated as each virtual machine of the plurality of virtual machines is quiesced, and may be independent of a state of other virtual machines of the plurality of virtual machines.

In accordance with additional aspects of this particular exemplary embodiment, editing of the at least one backup image may be configured to be performed independently of editing of any of the other of the backup images.

In yet another embodiment, the techniques may be realized as a system for improving snapshot performance comprising one or more processors communicatively coupled to a network. The one or more processors may be configured to initiate change block tracking for each unit of storage associated with each of a plurality of virtual machines, create backup images of each unit of storage associated with each of the plurality of virtual machines, quiesce each of the plurality of virtual machines, create snapshots of each unit of storage associated with each of the plurality of virtual machines, and identify one or more changed blocks in at least one of the backup images using the change block tracking. The processors may be configured to edit the at least one of the backup images by replacing the identified one or more changed blocks using corresponding blocks from at least one snapshot of the snapshots, and release the at least one snapshot based upon a determination that editing of the at least one backup image has completed and produced a consistent backup image, wherein release of the at least one snapshot may be independent of release of any other of the snapshots.

In accordance with additional aspects of this particular exemplary embodiment, quiescing of each of the plurality of virtual machines may be instantiated independently.

In accordance with additional aspects of this particular exemplary embodiment, the techniques may further comprise taking a storage snapshot for at least one of the units of storage after initiating change block tracking for the at least one of the units of storage.

In accordance with additional aspects of this particular exemplary embodiment, snapshot creation may be configured to be instantiated as each virtual machine of the plurality of virtual machines is quiesced, and is independent of a state of other virtual machines of the plurality of virtual machines.

In accordance with additional aspects of this particular exemplary embodiment, editing of the at least one backup image may be configured to be performed independently of editing of any of the other of the backup images.

In accordance with additional aspects of this particular exemplary embodiment, at least one of each the units of storage associated with each of a plurality of virtual machines may comprise physical storage.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
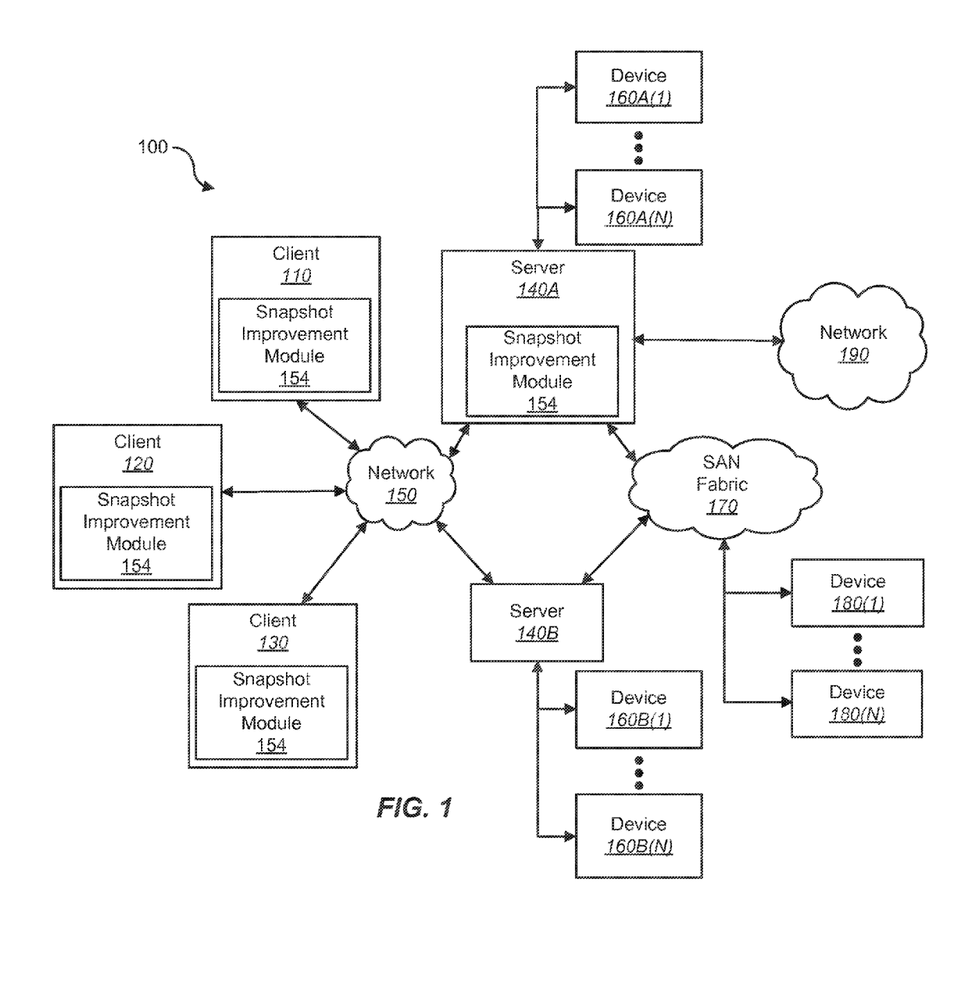
FIG. 1 shows a block diagram depicting a network architecture for improving snapshot performance in accordance with an embodiment of the present disclosure.

FIG. 1 shows a block diagram depicting a network architecture 100 for improving snapshot performance in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., snapshot improvement module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
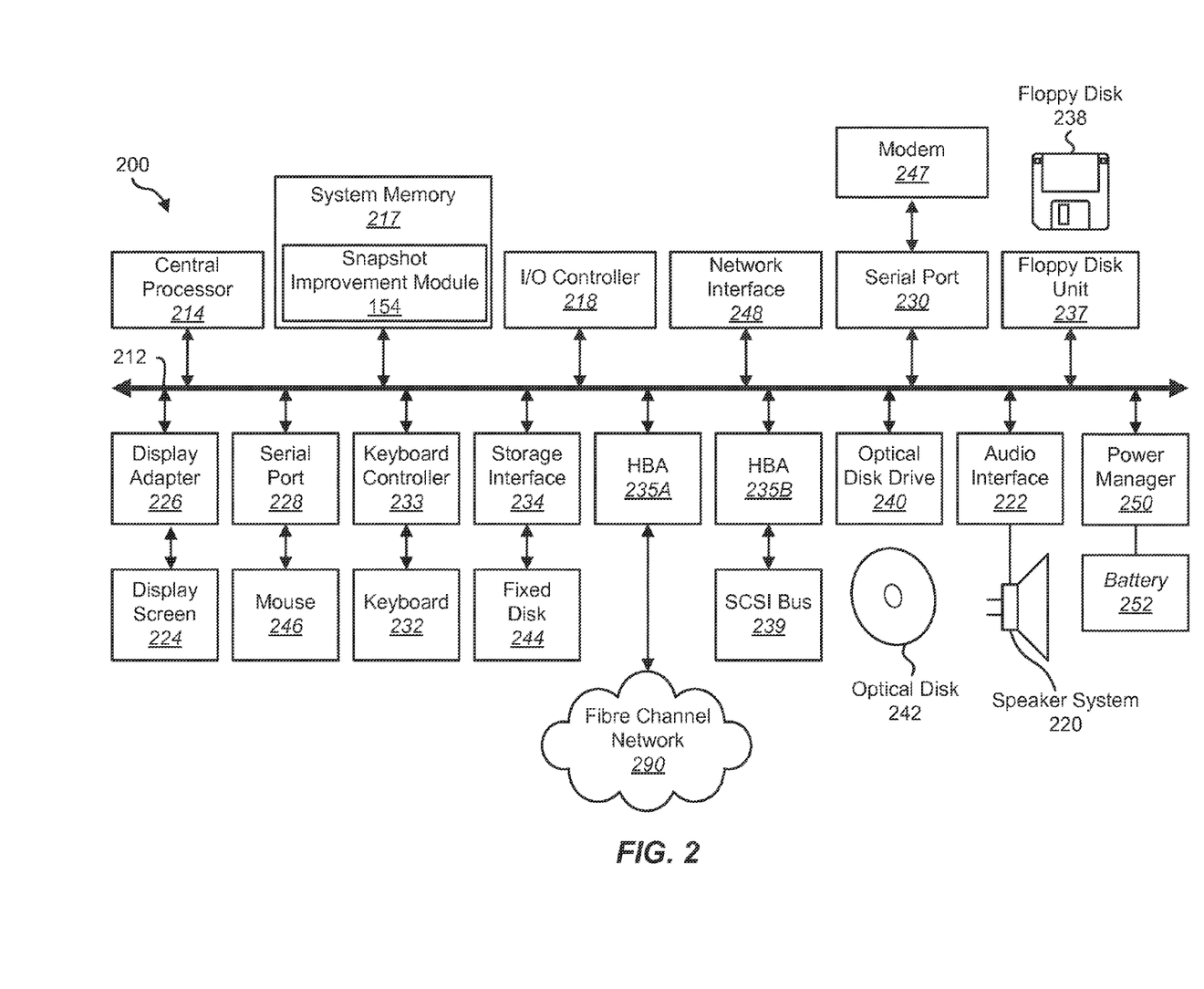
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for snapshot performance improvement such as, for example, snapshot improvement module 154. As illustrated, one or more portions of snapshot improvement module 154 may reside at a network centric location. For example, server 140A may be a server, a firewall, a gateway, a backup server, or other network element that may perform one or more actions to improve snapshot performance. According to some embodiments, network 190 may be an external network (e.g., the Internet) and server 140A may be a gateway or firewall between one or more internal components and clients and the external network.

A traditional backup of a plurality of virtual machines may require all virtual machines to be quiesced (e.g., pausing a state of running processes and flushing any writes to disk). After all virtual machines are quiesced then snapshots may be made of the virtual storage of all of the virtual machines on a platform (e.g., a server). A snapshot of underlying physical storage may be made as well. Backup images may be generated of the virtual storage of the virtual machines (e.g., virtual disks such as .vmdks) using the snapshots. After generation of the backup images for all of the virtual machines, the snapshots may be released. However, generation of a backup image may take a significant amount of time during which a snapshot may be maintained. When multiple backup images are required for a plurality of virtual machines on a platform, the time a snapshot is maintained may increase significantly. Once a snapshot is released, any Input/Output (I/O) that is queued to a temporary delta file during the snapshot may be written to the virtual disk. The resulting backlog of I/O may significantly increase I/O and CPU usage and may significantly degrade performance.

According to some embodiments, snapshot improvement module 154 may reduce a duration required for a snapshot when backing up a platform having a plurality of virtual machines. For example, snapshot improvement module 154 may allow snapshots to be created and released independently for each virtual machine thus decreasing the amount of time a snapshot is held. Specifically, snapshot improvement module 154 may allow a creation of a snapshot for a first virtual machine to be instantiated while other virtual machines on a platform are still being quiesced and creation of snapshots for the other virtual machines have not yet been instantiated.

Snapshot improvement module 154 may also allow for creation of a backup image prior to quiescing an snapshotting a virtual machine. Because creation of a backup image takes a significant amount of time and is one of the longer steps in a traditional backup process, creating a backup image prior to creation of a snapshot may greatly reduce an amount of time a snapshot is held. This may reduce an amount of I/O queued in a delta file.

Because of the changes, snapshot improvement module 154 may take several steps to be able to ensure creation of an application consistent backup image (e.g., a backup image in which application data is not lost). Snapshot improvement module 154 may start a backup process of a plurality of virtual machines by instantiating change block tracking for one or more underlying units of storage (e.g., a volume, a virtual disk, or a physical disk) supporting one or more of the virtual machines to be backed up. According to some embodiments, change block tracking may produce a bitmap or a list of changed blocks.

After change block tracking has been instantiated snapshot improvement module 154 may create a backup image for each unit of virtual storage associated with the virtual machines to be backed up.

After a backup image has been created for the storage associated with a virtual machine (e.g., the corresponding virtual disks), snapshot improvement module 154 may initiate quiescing of the virtual machine. Once the virtual machine is quiesced a snapshot of the virtual machine may be taken.

After generation of the snapshot, snapshot improvement module 154 may edit a backup image of the virtual machine to ensure consistency. Editing of the backup image to ensure consistency may include using change block tracking to identify blocks of a backup image that have changed. Identified changed blocks may be replaced with blocks from a corresponding snapshot for the virtual machine. According to some embodiments, editing of a backup image may be deferred and copies of blocks from a corresponding snapshot may be stored for later editing. If data identifying changed blocks in a backup image is available (e.g., change tracking) and data providing consistent blocks to replace the change blocks is available (e.g., stored in the backup image, stored in the snapshot, or stored separately from the snapshot or the backup image), editing of the backup image may be deferred. Replacing blocks in a backup image with blocks from a corresponding snapshot may ensure that a backup image is both crash and application consistent. Once a backup image for a virtual machine has been edited to ensure consistency or consistent data and data identifying changed blocks has been stored, snapshot improvement module 154 may release a snapshot of the storage of the virtual machine. Thus, editing of a backup image to ensure consistency may only include replacing changed blocks with consistent data from a corresponding snapshot. Because a backup image was written prior to the creation of a snapshot, and the snapshot may be held only for the duration of the editing of the backup image, the snapshot may be held for a significantly shorter period of time. Because backup images for each virtual machine may be created independently and snapshots may be created and released independently, each snapshot may only be held for the time it takes to ensure the consistency of a backup image regardless of the state of backup images for other virtual machines. Thus, the release of a snapshot may not be delayed until the backup images of all the other virtual machines is completed. Because of these efficiencies, snapshots may be held for a significantly shorter period of time and this may significantly reduce an amount of I/O queued in a delta file.

According to some embodiments, snapshot improvement module 154 may generate a snapshot of physical storage after initiating change block tracking. This may provide a single snapshot allowing for movement of all virtual machines across platforms. This may also ensure that a backup image is crash consistent (prior to editing of the backup image which may also ensure that a backup image is crash consistent and application consistent).

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, snapshot improvement module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
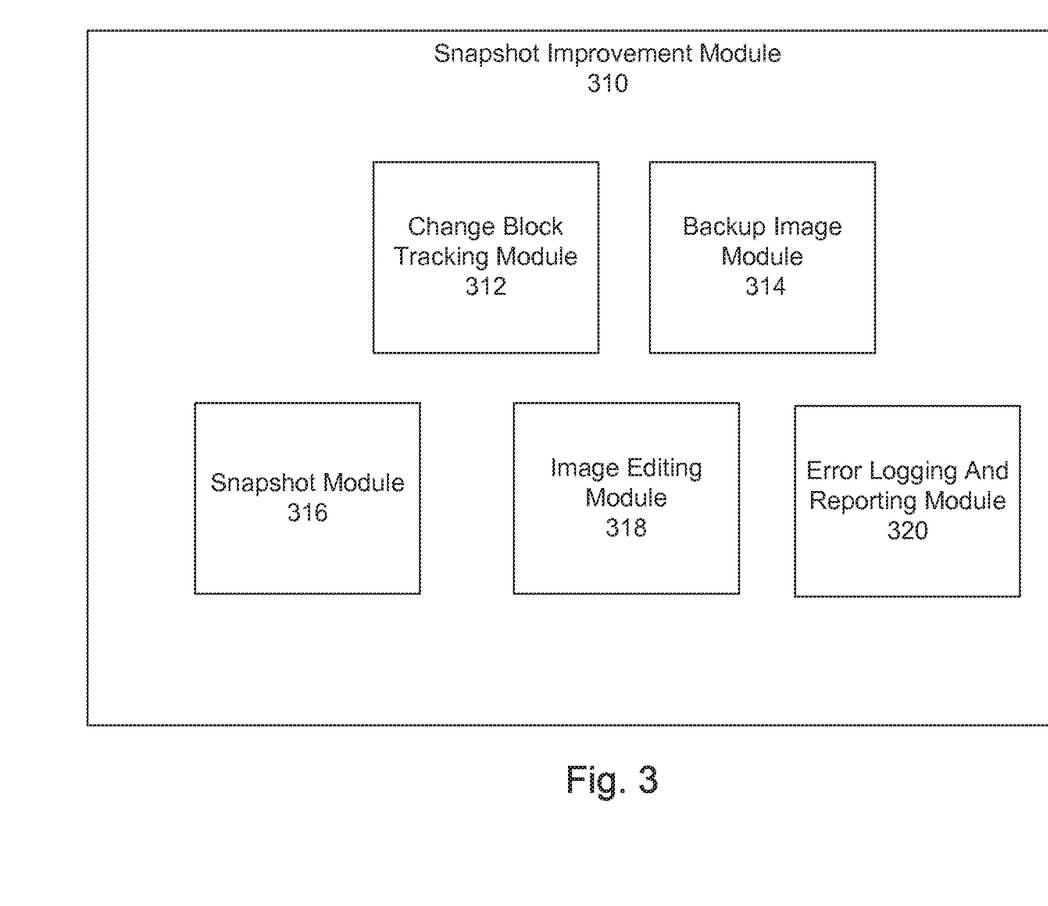
FIG. 3 shows a module for improving snapshot performance in accordance with an embodiment of the present disclosure.

Referring to FIG. 3, there is shown a snapshot performance improvement module 310 in accordance with an embodiment of the present disclosure. As illustrated, the snapshot performance improvement module 310 may contain one or more components including change block tracking module 312, backup image module 314, snapshot module 316, image editing module 318, and error logging and reporting module 320.

The description below describes network elements, computers, and/or components of a system and method for improving snapshot performance that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Change block tracking module 312 may generate a bitmap, a list, or other data structure indicating which blocks of storage have been changed. Change block tracking module 312 may be used to track modifications to underlying physical storage during a period from when a backup image of a virtual disk using that storage is created until a snapshot of the virtual disk is created. Information from change block tracking module 312 may be used to identify blocks modified in a corresponding backup image file that need to be updated from a snapshot.

Backup image module 314 may generate a backup image of virtual storage (e.g., a virtual disk) associated with one or more virtual machines. Backup image module 314 may generate a backup image of virtual storage associated with a virtual machine prior to snapshotting of the virtual machine.

Snapshot module 316 may quiesce a virtual machine and generate a snapshot of virtual storage of the virtual machine.

Image editing module 318 may correct inconsistent data in a backup image of a virtual machine unit of storage due to the generation of a backup image prior to quiescing and snapshotting a virtual machine. Image editing module 318 may use data from change block tracking module 312 to determine which blocks of a backup image have been modified and are thus inconsistent. Image editing module 318 may identify a corresponding snapshot and may use consistent data from the corresponding snapshot to overwrite the blocks in the backup image that have been changed. After a backup image has been modified to ensure consistency (e.g., application consistency or in some embodiments crash consistency), snapshot module 316 may release the corresponding snapshot. In some embodiments, consistent data and data identifying changed blocks may be stored and snapshot module 316 may release the corresponding snapshot prior to editing of the corresponding backup image.

Error logging and reporting module 320 may produce logs, reports, or other information associated with improving snapshot performance.

Figure 4:
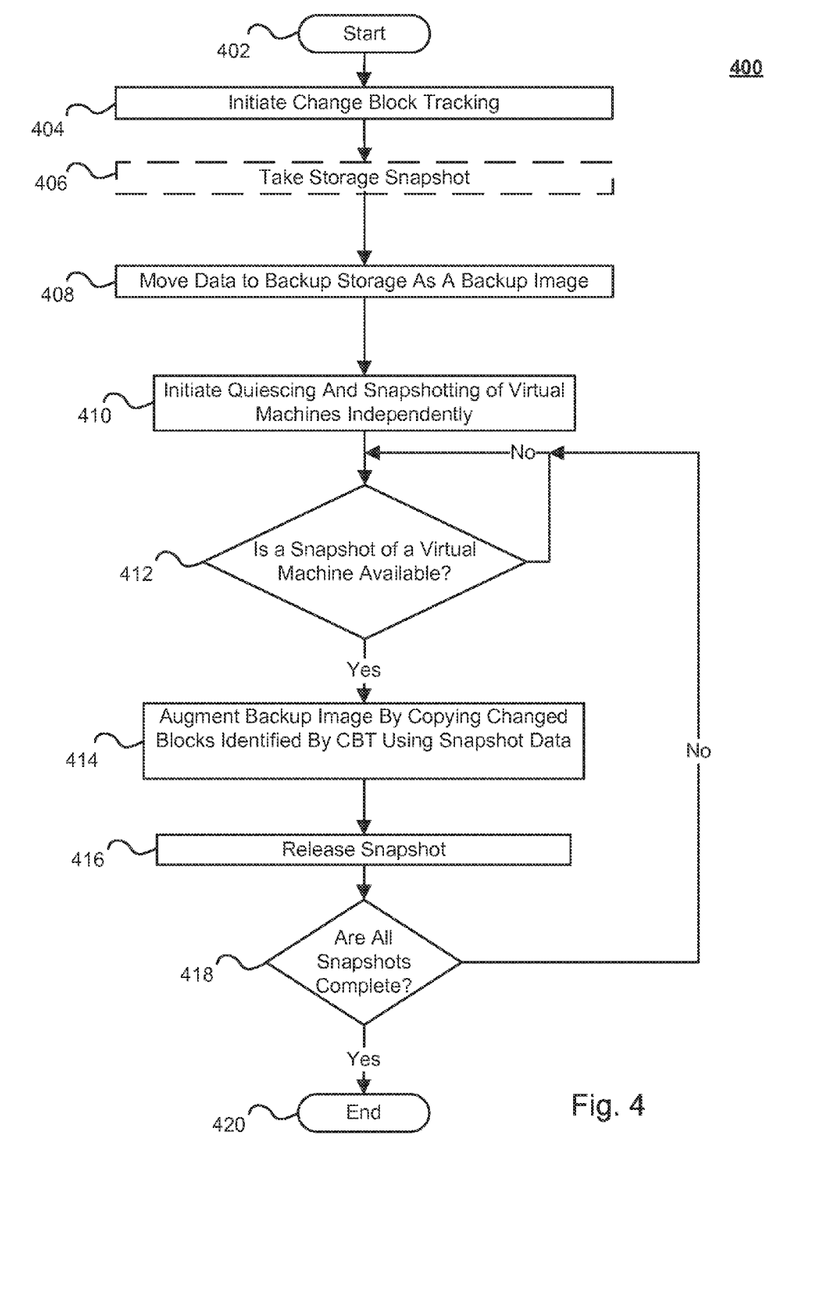
FIG. 4 depicts a method for improving snapshot performance in accordance with an embodiment of the present disclosure.

Referring to FIG. 4, there is depicted a method 400 for improving snapshot performance in accordance with an embodiment of the present disclosure. At block 402, the method 400 may begin.

At block 404, change block tracking may be initiated for one or more underlying units of storage (e.g., a volume, a virtual disk, or a physical disk) supporting one or more of the virtual machines to be backed up. According to some embodiments, change block tracking may produce a bitmap or a list of changed blocks.

At block 406 an optional process may be performed. According to some embodiments, a snapshot of physical storage may be generated after initiating change block tracking. This may provide a single snapshot allowing for movement of all virtual machines across platforms. This may also ensure that a backup image is crash consistent (prior to editing of the backup image which may also ensure that a backup image is crash consistent and application consistent).

At block 408, a backup image may be created for each unit of virtual storage (e.g., the corresponding virtual disks) associated with the virtual machines to be backed up.

At block 410, quiescing of a virtual machine may be initiated. Once the virtual machine is quiesced a snapshot of the virtual machine may be taken. Initiation of quiescing and snapshotting of virtual machines may be independent of each other and may depend upon when a backup image for a particular virtual machine is complete. According to some embodiments, in Initiation of quiescing and snapshotting of virtual machines may occur at a same time.

According to some embodiments, at block 412 creation of a snapshot may be detected. After generation of the snapshot is complete the process 400 may continue at block 414. If a snapshot has not been completed the process may return to block 412.

At block 414, a backup image of the virtual machine may be augmented to ensure consistency. Augmenting the backup image to ensure consistency may include using change block tracking to identify blocks of a backup image that have changed. Blocks in a snapshot image of a virtual machine which correspond to those identified as changed in the backup image may be saved. For example, blocks from a corresponding snapshot image may be added to a backup image. In some embodiments, identified changed blocks in a backup image may be replaced with blocks from a corresponding snapshot for the virtual machine. In some embodiments, editing of a backup image may be deferred until later. A consistent backup image may be ensured if there is data identifying blocks changed in a backup image (e.g., via change block tracking) and stored copies of blocks providing consistent data for the changed blocks. In some embodiments, a backup image with stored consistent data may be edited later (e.g., after release of a corresponding snapshot). Replacing blocks in a backup image with blocks from a corresponding snapshot may ensure that a backup image is both crash and application consistent.

At block 416, once a backup image for a virtual machine has been edited to ensure consistency or copies of consistent data have been stored, snapshot improvement module 154 may release a snapshot of the storage of the virtual machine. Releasing of a snapshot of a virtual machine may be independent of a status of other virtual machines and snapshots for other virtual machines. Once a snapshot for a virtual machine storage unit is released, a delta file of queued I/O transactions may be merged into the storage unit (e.g., virtual disk) for the virtual machine.

At block 418 it may be determined whether all snapshots for a backup process are complete. If additional snapshots are being created, the method 400 may return to block 412, if no additional snapshots are being created, the method 400 may end at block 420.

At this point it should be noted that improving snapshot performance in accordance with the present disclosure as described above typically involves the processing of input data and the generation of output data to some extent. This input data processing and output data generation may be implemented in hardware or software. For example, specific electronic components may be employed in a snapshot performance improvement module or similar or related circuitry for implementing the functions associated with improving snapshot performance in accordance with the present disclosure as described above. Alternatively, one or more processors operating in accordance with instructions may implement the functions associated with improving snapshot performance in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for improving snapshot performance comprising:

initiating change block tracking for each unit of storage associated with each of a plurality of virtual machines;
creating backup images of each unit of storage associated with each of the plurality of virtual machines;
quiescing each of the plurality of virtual machines;
creating snapshots of each unit of storage associated with each of the plurality of virtual machines;
identifying, using at least one computer processor, one or more changed blocks in at least one of the backup images using the change block tracking;
editing the at least one of the backup images by replacing the identified one or more changed blocks using corresponding blocks from at least one snapshot of the snapshots; and
releasing the at least one snapshot based upon a determination that editing of the at least one backup image has completed and produced a consistent backup image, wherein release of the at least one snapshot is independent of release of any other of the snapshots.

2. The method of claim 1, wherein quiescing of each of the plurality of virtual machines is instantiated independently.

3. The method of claim 1, further comprising taking a storage snapshot for at least one of the units of storage after initiating change block tracking for the at least one of the units of storage.

4. The method of claim 3, where the storage snapshot provides a single snapshot allowing restoration of all of the plurality of virtual machines.

5. The method of claim 1, where the consistent backup image is a crash consistent backup image.

6. The method of claim 1, wherein the consistent backup image is an application consistent backup image.

7. The method of claim 1, wherein the snapshot creation is configured to be instantiated as each virtual machine of the plurality of virtual machines is quiesced, and is independent of a state of other virtual machines of the plurality of virtual machines.

8. The method of claim 1, wherein editing of the at least one backup image is configured to be performed independently of editing of any of the other of the backup images.

9. The method of claim 1, wherein the unit of storage comprises a virtual hard drive.

10. The method of claim 1, wherein at least one unit of storage associated with each of the plurality of virtual machines comprises physical storage.

11. At least one non-transitory processor readable storage medium storing a computer program of instructions configured to be readable by at least one processor for instructing the at least one processor to execute a computer process for performing the method as recited in claim 1.

12. An article of manufacture for improving snapshot performance, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
initiate change block tracking for each unit of storage associated with each of a plurality of virtual machines;
create backup images of each unit of storage associated with each of the plurality of virtual machines;
quiesce each of the plurality of virtual machines;
create snapshots of each unit of storage associated with each of the plurality of virtual machines;
identify one or more changed blocks in at least one of the backup images using the change block tracking;
edit the at least one of the backup images by replacing the identified one or more changed blocks using corresponding blocks from at least one snapshot of the snapshots; and
release the at least one snapshot based upon a determination that editing of the at least one backup image has completed and produced a consistent backup image, wherein release of the at least one snapshot is independent of release of any other of the snapshots.

13. The article of manufacture of claim 12, wherein the snapshot creation is configured to be instantiated as each virtual machine of the plurality of virtual machines is quiesced, and is independent of a state of other virtual machines of the plurality of virtual machines.

14. The article of manufacture of claim 12, wherein editing of the at least one backup image is configured to be performed independently of editing of any of the other of the backup images.

15. A system for improving snapshot performance comprising:
one or more processors communicatively coupled to a network; wherein the one or more processors are configured to:
initiate change block tracking for each unit of storage associated with each of a plurality of virtual machines;
create backup images of each unit of storage associated with each of the plurality of virtual machines;
quiesce each of the plurality of virtual machines;
create snapshots of each unit of storage associated with each of the plurality of virtual machines;
identify one or more changed blocks in at least one of the backup images using the change block tracking;
edit the at least one of the backup images by replacing the identified one or more changed blocks using corresponding blocks from at least one snapshot of the snapshots; and
release the at least one snapshot based upon a determination that editing of the at least one backup image has completed and produced a consistent backup image, wherein release of the at least one snapshot is independent of release of any other of the snapshots.

16. The system for improving snapshot performance of claim 15, wherein quiescing of each of the plurality of virtual machines is instantiated independently.

17. The system for improving snapshot performance of claim 15, further comprising taking a storage snapshot for at least one of the units of storage after initiating change block tracking for the at least one of the units of storage.

18. The system for improving snapshot performance of claim 15, wherein the snapshot creation is configured to be instantiated as each virtual machine of the plurality of virtual machines is quiesced, and is independent of a state of other virtual machines of the plurality of virtual machines.

19. The system for improving snapshot performance of claim 15, wherein editing of the at least one backup image is configured to be performed independently of editing of any of the other of the backup images.

20. The system for improving snapshot performance of claim 15, wherein at least one of each the units of storage associated with each of a plurality of virtual machines comprises physical storage.

* * * * *